UNITED STATES PATENT OFFICE.

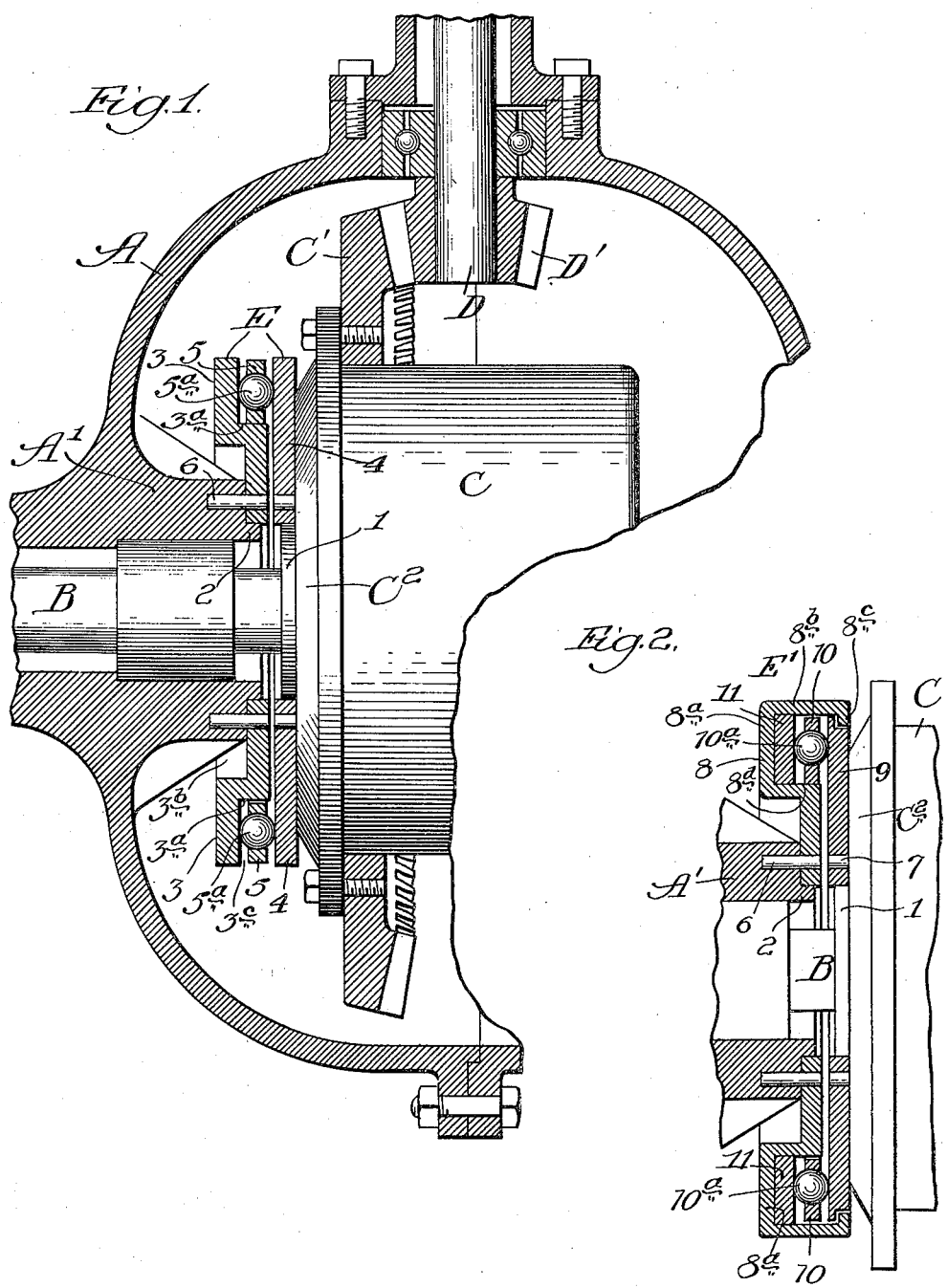

JOSEPH DE MARTINO, OF CHICAGO, ILLINOIS, ASSIGNOR TO SIMPLEX CORPORATION, OF CHICAGO, ILLINOIS, A CORPORATION OF ILLINOIS.

ANTIFRICTION-BEARING.

1,326,034.          Specification of Letters Patent.          Patented Dec. 23, 1919.

Application filed February 17, 1919. Serial No. 277,423.

*To all whom it may concern:*

Be it known that I, JOSEPH DE MARTINO, a native of Italy, residing at Chicago, in the county of Cook and State of Illinois, have invented a new and useful Improvement in Antifriction-Bearings, of which the following is a specification.

This invention relates particularly to anti-friction bearings adapted to be employed in lieu of thrust-washers, where only a small space is available between machine elements, or between a machine element and a bearing, for the introduction of the anti-friction bearing.

The primary object is to provide an improved bearing of this type, which is strong and durable, and which will not be deranged or get out of order when the bearing becomes worn.

The invention is illustrated in its preferred form in the accompanying drawing, in which—

Figure 1 represents a broken sectional view showing the improved anti-friction bearing applied, for example, to the differential gear mechanism of an automobile; and Fig. 2 represents a broken sectional view showing the improved bearing in modified form.

Referring to Fig. 1, A represents a stationary gear-housing of differential gear mechanism; B, a shaft, or axle, extending into the gear-housing; C, a rotary drum, or gear-case, equipped with an actuating gear C', it being understood that the member C is equipped internally with pinions which mesh with the usual pinions on the inner ends of the axle-shafts; D, the drive-shaft which extends rearwardly from the transmission mechanism of the machine and is equipped with a pinion D' meshing with the gear C'; and E, the improved anti-friction thrust bearing interposed between the rotary member C and the stationary hub A' with which the housing A is provided. The end member C² of the rotary drum, or gear-case, C, is provided, in a type of differential gear mechanism which is in common use, with a reduced central hub 1, and the hub A' is likewise provided with a reduced hub-extension 2. Ordinarily, these small hubs have been equipped with thrust-washers, for which the improved anti-friction thrust-bearing affords a substitute.

The anti-friction bearing E preferably comprises annular nickel-chrome steel plates 3 and 4, whose slightly separated inner circumferential portions are adapted to occupy the restricted space between the hub A' and the adjacent end of the rotary drum C; and an annular ball-retainer 5 provided with an annular series of recesses accommodating balls 5ª, located in an enlarged space between the outer marginal portions of the annular plates 3 and 4. In the illustration given, the enlarged annular space for the ball-retainer 5 and the balls 5ª mounted therein is provided by so off-setting the outer marginal portion of the plate 3, that is, the portion outside of the hub-portion A', as to afford an annular bearing, or shoulder, 3ª, upon which the ball-retaining ring 5 is journaled. Thus, the annular plate 3 has its outer surface provided with the large central counter-sink 3ᵇ which freely accommodates the hub A', while the inner surface of the outer circumferential portion of the annular plate 3 is provided with the annular recess 3ᶜ, the bottom of the annular recess 3ᶜ affording the inwardly projecting bearing 3ª upon which the retainer-ring 5 is journaled. The lateral wall of the recesss 3ᶜ affords an annular plane surface for receiving the thrust of the balls 5ª. The annular plate 4, in the illustration given, has a flat plane face on each side. Thus, it will be noted that the ball race provided by the plates 3 and 4 is of enlarged cross-section outside of the hub A'. The annular plates are fitted on the hub-extensions 1 and 2 and are provided near their bores with perforations which engage studs 6 and 7, with which the hub A' and the end wall of the drum C are equipped respectively.

From the description given, it will be understood that the retainer-ring 5 is adequately journaled on the annular shoulder 3ª of the plate 3, while the balls 5ª are interposed between plane surfaces. Thus, there is no opportunity for the retainer-ring to drop from its proper position as the play between the race members increases, due to wear.

The annular race members 3 and 4 may be formed of drop forgings, if desired; and the faces which must afford bearing surfaces may be readily trued by a grinding operation.

In the modification shown in Fig. 2, the improved anti-friction bearing is designated E'. In this form, the bearing comprises a pressed steel race-member 8; a companion race-member 9, and a ball-retainer 10 provided with balls 10ª. The plates 8 and 9 are fitted on the hub-extensions in the same manner as shown in Fig. 1. In the pressing or stamping operation, the plate 8 is cupped annularly at its outer portion to afford the laterally off-set wall 8ª and the inwardly projecting circumferential flange 8ᵇ, whose edge-portion is bent inwardly, as indicated at 8ᶜ, to lightly embrace the edge-portion of the plate 9. The annular cup thus provided receives a nickel-chrome annular bearing member 11, against which the balls bear at one side. In the cupping or off-setting operation, the member 8 is provided with the annular shoulder, or hub, 8ᵈ, on which the retainer ring 10 is journaled. Thus, the retainer-ring is provided with an adequate bearing, which serves to prevent the ring and anti-friction balls from dropping as the play between the race members increases, due to wear. The improved bearing may be advantageously employed between relatively rotating members of various mechanisms in use, where it is desired to substitute an anti-friction thrust-bearing for common thrust washers, and where only restricted space is available for the insertion of the anti-friction bearing between the members or elements of the mechanism to which the anti-thrust bearing is to be applied.

The construction described provides, in a simple and effective manner, against any objectionable shifting of the retainer-ring and balls from their proper location, so that injury to the mechanism is obviated.

What I regard as new, and desire to secure by Letters Patent, is:

1. A thrust-bearing of the class described adapted for use, within a restricted space between relatively rotatable members of a mechanism, comprising a pair of annular bearing-members having closely spaced inner circumferential portions adapted for insertion in such restricted space and presenting an enlarged outer circumferential portion with an enlarged space, one of said bearing-members having an annular shoulder affording a journal, and a ball-retaining ring mounted on said journal and provided with balls confined in said enlarged space.

2. In means of the character set forth, the combination of a housing-member provided interiorly with a hub, a rotatable member presenting a plane lateral face projecting beyond the circumference of said hub, an annular bearing-member having a surface bearing against the end of said hub and having an off-set outer circumferential portion which freely encircles the hub and an annular recess in the inner face of its outer circumferential portion affording at its bottom a journal, an annular bearing-member extending into the space between said hub and said rotatable member and bearing against the lateral bearing surface of said rotatable member, a retainer-ring mounted on said journal, and balls carried by said retainer-ring and interposed between the outer circumferential portions of said annular bearing-members.

3. A thrust-bearing of the class described adapted for use within a restricted space between relatively rotatable members of a mechanism, comprising a pair of annular bearing-members having closely spaced inner circumferential portions adapted to said restricted space, one of said bearing members having its outer peripheral portion cupped laterally to afford space for a race and having a circumferential flange affording an outer circumferential wall for the race, said circumferential flange having free engagement with the outer circumferential portion of the companion bearing member, an annular bearing ring inserted in the annular space afforded by said cupped portion, said cupped bearing member presenting an inwardly projecting shoulder affording a journal, a retainer-ring mounted on said journal, and balls mounted in said retainer-ring.

JOSEPH DE MARTINO.